(12) United States Patent
Thakur et al.

(10) Patent No.: US 12,230,866 B2
(45) Date of Patent: Feb. 18, 2025

(54) TECHNIQUES FOR SPECIFIC ABSORPTION RATE (SAR) SENSING ELEMENTS IN SAR CIRCUITS

(71) Applicant: Intel Corporation, Santa Clara, CA (US)

(72) Inventors: Jayprakash Thakur, Bangalore KA (IN); Maruti Tamrakar, Tamil Nadu (IN); Sagar Gupta, Ghaziabad (IN); Prasanna Pichumani, Bangalore KA (IN); Sudheera Sudhakar, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 905 days.

(21) Appl. No.: 17/129,698

(22) Filed: Dec. 21, 2020

(65) Prior Publication Data

US 2021/0111481 A1   Apr. 15, 2021

(51) Int. Cl.
| | | |
|---|---|---|
| *H01Q 1/24* | (2006.01) | |
| *H04B 1/3827* | (2015.01) | |
| *H04B 1/401* | (2015.01) | |
| *H04W 52/36* | (2009.01) | |

(52) U.S. Cl.
CPC ........... *H01Q 1/245* (2013.01); *H04B 1/3827* (2013.01); *H04B 1/401* (2013.01); *H04W 52/367* (2013.01)

(58) Field of Classification Search
CPC ........ H01Q 1/245; H01Q 1/44; H04B 1/3827; H04B 1/401; H04B 1/3838; H04W 52/367; H04W 52/0216; Y02D 30/70
See application file for complete search history.

(56) References Cited

U.S. PATENT DOCUMENTS

| | | | |
|---|---|---|---|
| 8,649,833 B1 | 2/2014 | Lee et al. | |
| 9,257,750 B2* | 2/2016 | Vazquez | .................. H01Q 9/42 |
| 2013/0300618 A1 | 11/2013 | Yarga et al. | |
| 2016/0172749 A1 | 6/2016 | Heng | |

OTHER PUBLICATIONS

Extended European Search Report received from EPO mailed on Mar. 18, 2022, 8 pages.

* cited by examiner

*Primary Examiner* — Seung H Lee
(74) *Attorney, Agent, or Firm* — Schwabe, Williamson & Wyatt, P.C.

(57) ABSTRACT

Various embodiments utilize part of an existing antenna pattern in a computing device to implement a specific absorption rate (SAR) sensor element using a radio frequency (RF) filter circuit. The integrated solutions of the present disclosure help to eliminate the external SAR sensor pad requirement and further help to improve wireless performance. The embodiments of the present disclosure may be implemented with a variety of different types of antenna (e.g., slot, metal ring/aperture, PCB, etc.). Other embodiments may be described and claimed.

10 Claims, 18 Drawing Sheets

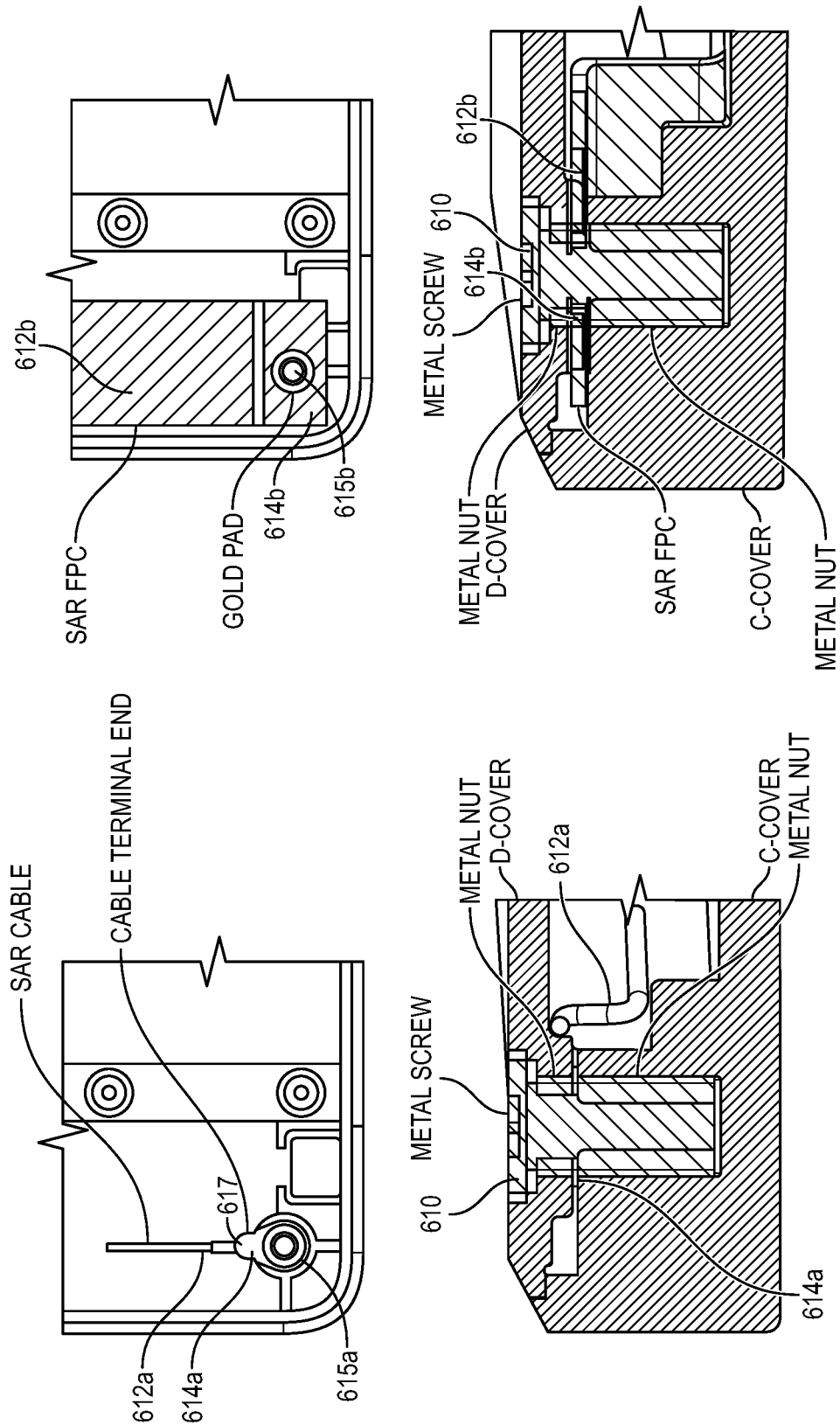

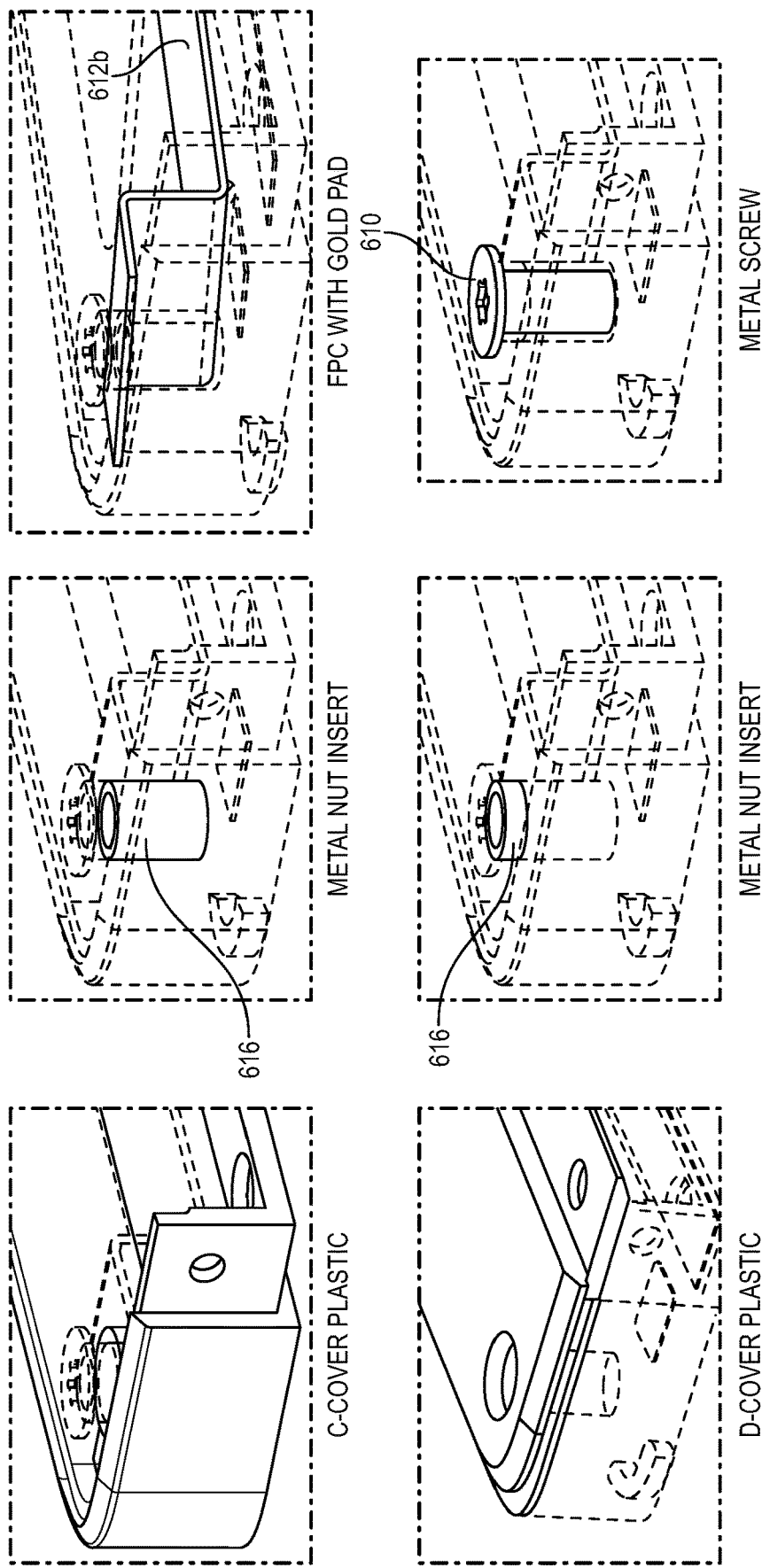

TECHNIQUES FOR SPECIFIC ABSORPTION RATE (SAR) SENSING ELEMENTS IN SAR CIRCUITS

FIELD

Embodiments of the present invention relate generally to the technical field of wireless communications, and more particularly to techniques for specific absorption rate (SAR) circuits.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Specific absorption rate (SAR) reflects a measure of radio frequency (RF) energy absorbed by a human in proximity to a computing device (such as a laptop or tablet). Such proximity detection is typically used to reduce RF emission/transmit power to meet regulatory (e.g., Federal Communications Commission (FCC)) requirements. In conventional systems, SAR sensing pads (elements) are placed on both the sides of the antenna. The SAR sensing pads and a sensor integrated circuit (IC) controller are often placed in the same flexible printed circuit (FPC) or can be connected using cable.

SAR sensors are required to reduce or stop the transmitter from transmitting power beyond a predetermined limit, which is defined for human safety. Previously, SAR was not a concern in laptop systems because antennas ware placed in the lid and there were typically no use cases when the antenna would come close to a human user.

However, recent demand for narrow bezel laptop systems that include fifth generation (5G) wireless cellular connectivity has forced system designers to place the antennas at the base of the laptop. For many 5G and wireless local area network (WLAN) wireless systems, at least four transmitting antennas (two for 5G transmissions, and two for WLAN transmissions) require SAR sensor elements to control their transmit power. This means an increased number of SAR sensing elements, which consume a significant amount of space near to the antennas in such systems. As an example, for 5G and WLAN connectivity wireless systems, at least eight SAR sensing pads having a size of approximately 10×5 mm are typically required. Accordingly, it takes approximately 500 square mm area in conventional systems to place the SAR sensing pads (excluding gap requirement between SAR sensing pad and antenna). Furthermore, the placement of the SAR sensing pads in close proximity to the antennas can cause a significant decrease in antenna performance. Embodiments of the present disclosure address these and other issues by utilizing existing antenna parts and/or other components of a computing device to implement SAR sensor elements.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 6A-6G illustrate examples of SAR sensing element implementations using a conductive fastener in accordance with various embodiments.

DETAILED DESCRIPTION

Figure 1:
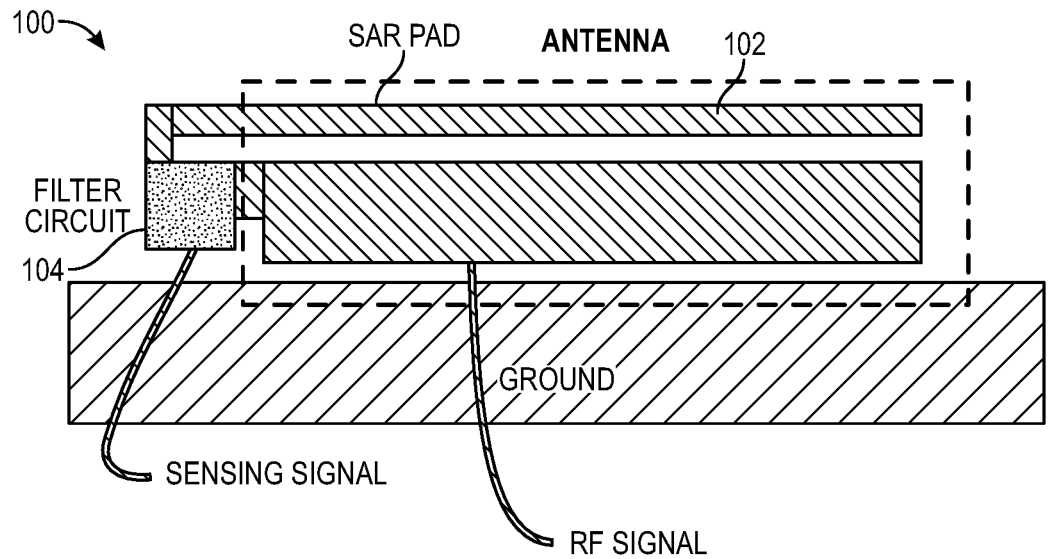
FIG. 1 illustrates an example of utilizing an antenna assembly to provide a separate RF signal and SAR signal in accordance with various embodiments.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

With recent developments of wireless technologies (e.g., 5G, Wi-Fi 6E), the numbers of antennas are increasing in computing devices and other systems. The radio frequency (RF) exposure conditions for wireless systems are generally associated with the antennas installed in the display screen (e.g., the lid of a laptop) and keyboard compartment (e.g., the base of a laptop). SAR sensors are required for any transmitting antenna placed in the base, and each SAR sensor needs additional non-metal space in a system. SAR sensors are required to detect human body proximity in the wireless systems (e.g., laptops, tablets, etc.) to reduce and control radio frequency (RF) emission power in the presence of a human body. The existing sensing element (sensor pad) in an SAR Sensor is typically a rectangular conductor pad printed on printed circuit board (PCB)/FPC and generally has a minimum size of about 10×5 mm.

In conventional systems, the SAR sensing pads and sensor IC may be disposed in the same FPC or connected using a cable. The SAR sensing pads are typically disposed on either side of the antenna to detect the proximity of a human. In some conventional systems, the antenna is sometimes used as an SAR sensor, but the RF signal from the antenna is carried together with SAR signal by the RF cable. The RF signal and SAR signal are then split in the main board.

However, there are a number of disadvantages with such conventional systems. For example, these existing solutions require additional SAR sensing element pads to function, thereby increasing the complexity of the system and requiring additional space for SAR pads. Moreover, the antenna and SAR require a "keep out" zone (e.g., an area around the antenna without any traces) and plastic (non-metal/conductive) space to function. Additionally, with respect to FIG. 1B, using the antenna as an SAR may affect antenna performance due to combining the SAR signal with the RF signal via the RF cable.

In embodiments of the present disclosure, by contrast, part of an existing antenna pattern having various metal traces in a computing device can be used as an SAR sensor element using an RF filter circuit. For example, FIG. 1 illustrates an example of utilizing an antenna assembly to provide a separate RF signal and SAR signal in accordance with various embodiments. In this example, antenna assembly 100 includes an antenna 102 coupled to a filter circuit to provide separate sensing signals and RF signals.

In some embodiments, the RF signal and SAR Sensor signal are separated by Low-pass and High-pass filters in the filter circuit, as the operating frequency of SAR sensor is in the range of a few MHz, significantly less compared to the higher RF frequencies associated with cellular or Wi-Fi. The integrated solutions of the present disclosure help to eliminate the external SAR Pad requirement and further help to improve wireless performance. The embodiments of the present disclosure may be implemented with a variety of different types of antenna (e.g., slot, metal ring/aperture, PCB, etc.). Embodiments further provide for easy assembly and alignment of an SAR element with an antenna and other systems.

Figure 2:
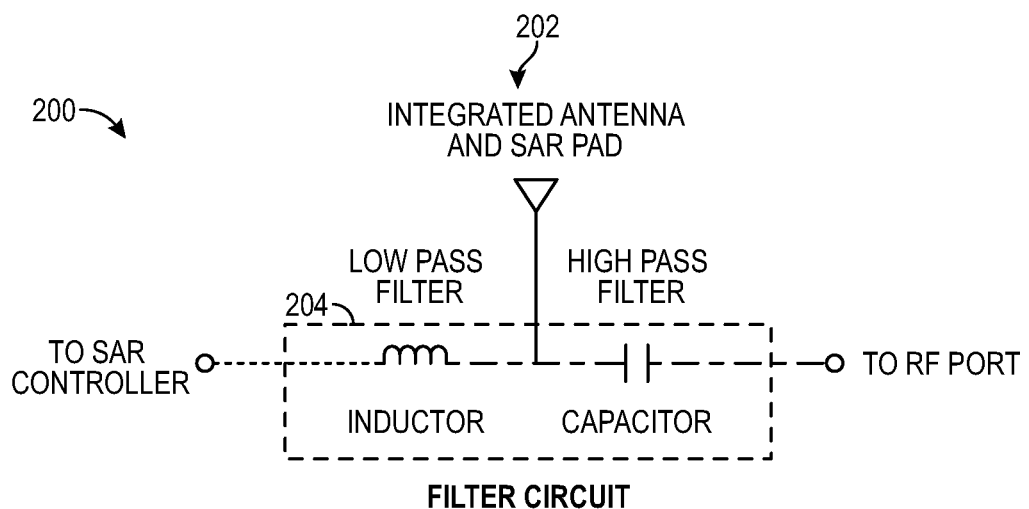
FIG. 2 illustrates an example of an SAR sensing element with antenna in accordance with various embodiments.

FIG. 2 illustrates a schematic diagram 200 whereby part of an existing antenna pattern 202 itself is utilized in conjunction with a filter circuit 204 as an SAR sensing pad (sensing element) in accordance with various embodiments. In this example, antenna 202 is coupled to filter circuit 204 which includes a low-pass filter comprising an inductor, and a high-pass filter including a capacitor. As noted above, the SAR signal is of a considerably lower frequency than the RF signal. Accordingly, the low-pass filter (inductor) of the filter circuit 204 passes the lower-frequency SAR signal to the SAR controller, while blocking the higher-frequency RF signal. The high-pass filter (capacitor) of the filter circuit passes the higher-frequency RF signal to the RF port, while blocking the lower-frequency SAR signal. As a result, the antenna assembly 200 can utilize an existing antenna of a computing device to provide separate a SAR signal and RF signal to the SAR controller and RF port, respectively, thus providing these signals without the need for extra sensing pads and without degrading the performance of the antenna by mixing the RF and SAR signals.

SAR Sensing Element Implementation for a PCB Antenna

Figure 3A:
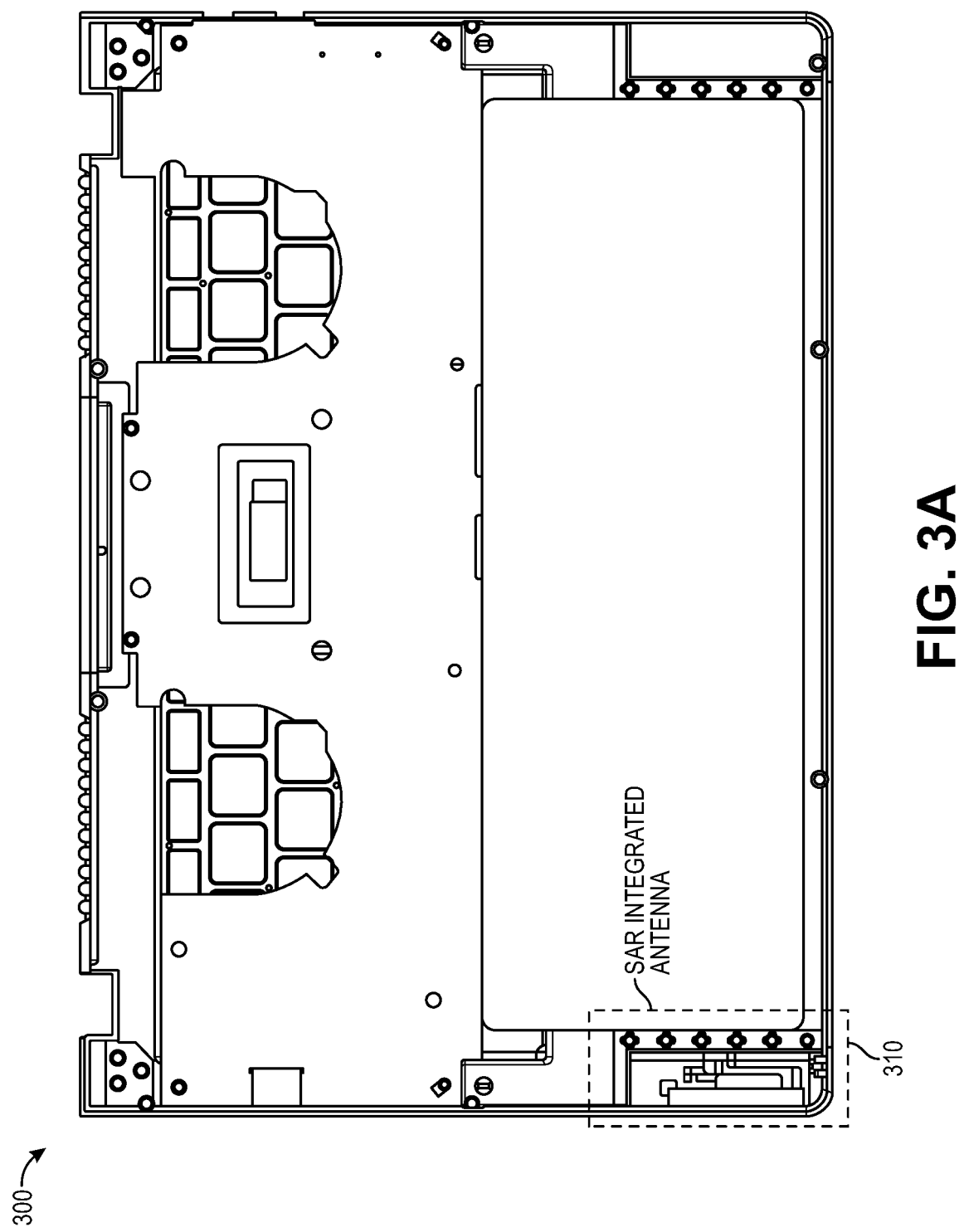
FIGS. 3A-3E illustrate examples of antenna and SAR assemblies in a laptop computing device in accordance with various embodiments.
Figure 3C:
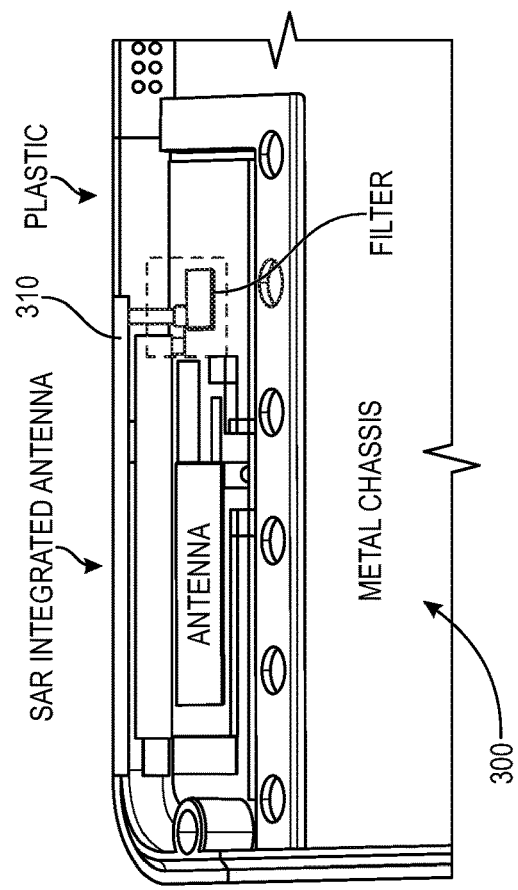
Figure 3B:
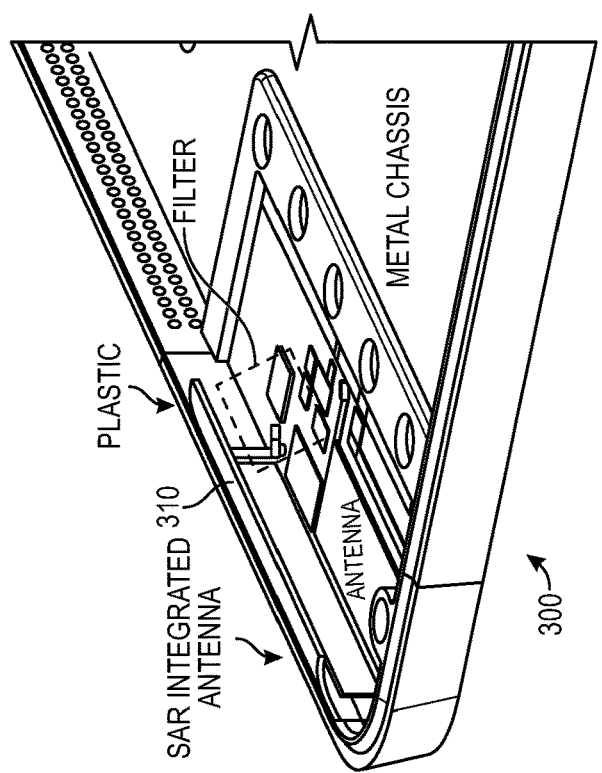

PCB antennas are typically is implemented on a plastic material. As illustrated in FIGS. 3A-3E, embodiments of the present disclosure may implement an SAR sensor element (SAR integrated antenna 310) by coupling a filter to the PCB antenna in laptop 300. Similar SAR sensor elements may be implemented in other computing devices. FIGS. 3A-3C illustrate the positioning and components of an example of an SAR integrated antenna 310 according to various embodiments. As illustrated in more detail in FIGS. 3D and 3E, the SAR integrated antenna 310 includes a first portion of the antenna (Z-section) 312 that is acting as an SAR sensing pad. Filter circuit 320 includes an inductor 322 that is used as a low-pass filter on the antenna to separate the SAR signal (passing the lower-frequency SAR signal to the SAR controller and blocking the higher-frequency RF signal). Filter circuit 320 further includes a capacitor 324 that is used as a high-pass filter to block the SAR signal and pass the RF signal to an RF port. It will be apparent that some embodiments may include additional circuit elements in the high-pass filter and/or low pass filter. For example, in some embodiments, an inductor may be coupled in shunt with the signal path (between the signal path and ground) of the high pass filter to pass low frequencies to ground. Additionally, or alternatively, a capacitor may be coupled in shunt with the signal path of the low pass filter to pass high frequencies to ground.

Figure 3D:
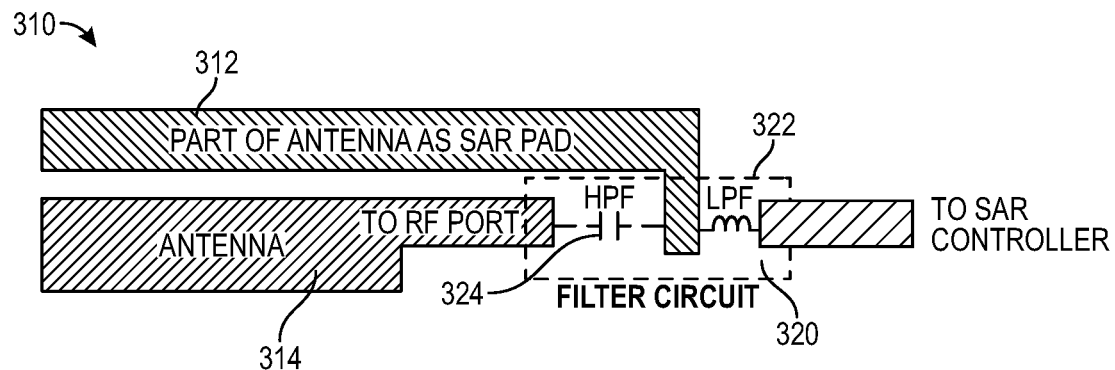
Figure 3E:
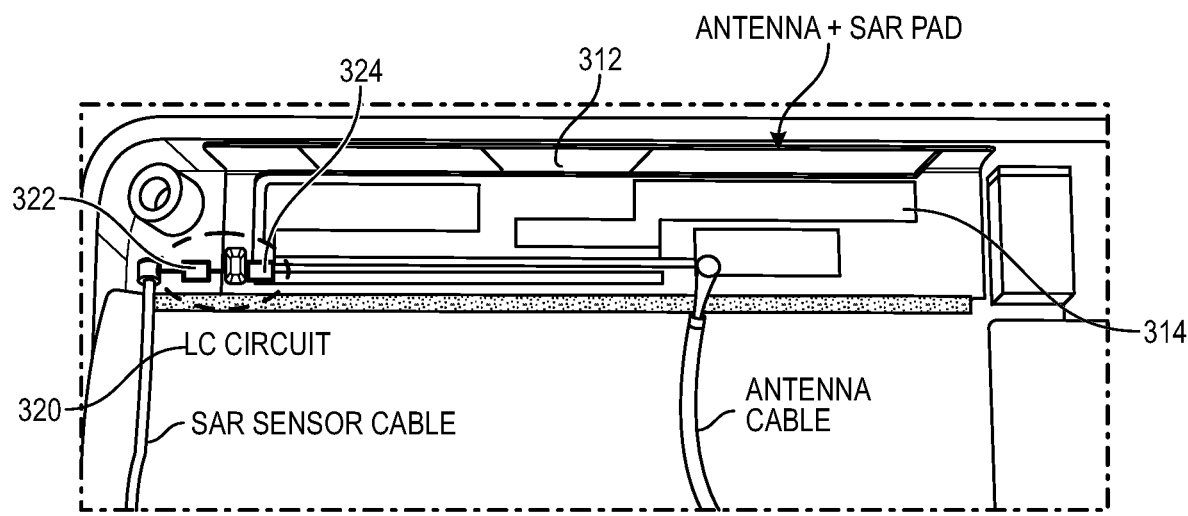

In the examples shown in FIGS. 3D and 3E, the inductor of the low pass filter 322 is coupled between the antenna and the SAR controller, and the capacitor of the high pass filter 314 includes a capacitor coupled between the antenna and the RF port. More specifically, the antenna is part of an antenna assembly that includes a first conductive antenna portion 312 and a second conductive antenna portion 314 coupled to the RF port. The first conductive antenna portion 312 is coupled to a first lead of the capacitor 324 and the second conductive antenna portion 314 is coupled to a second lead of the capacitor 324. In this example, the RF signal can be provided to the RF port using both portions 312 and 314, and the SAR signal from portion 312 does not interfere with the RF signal delivered to the RF port.

Figure 3F:
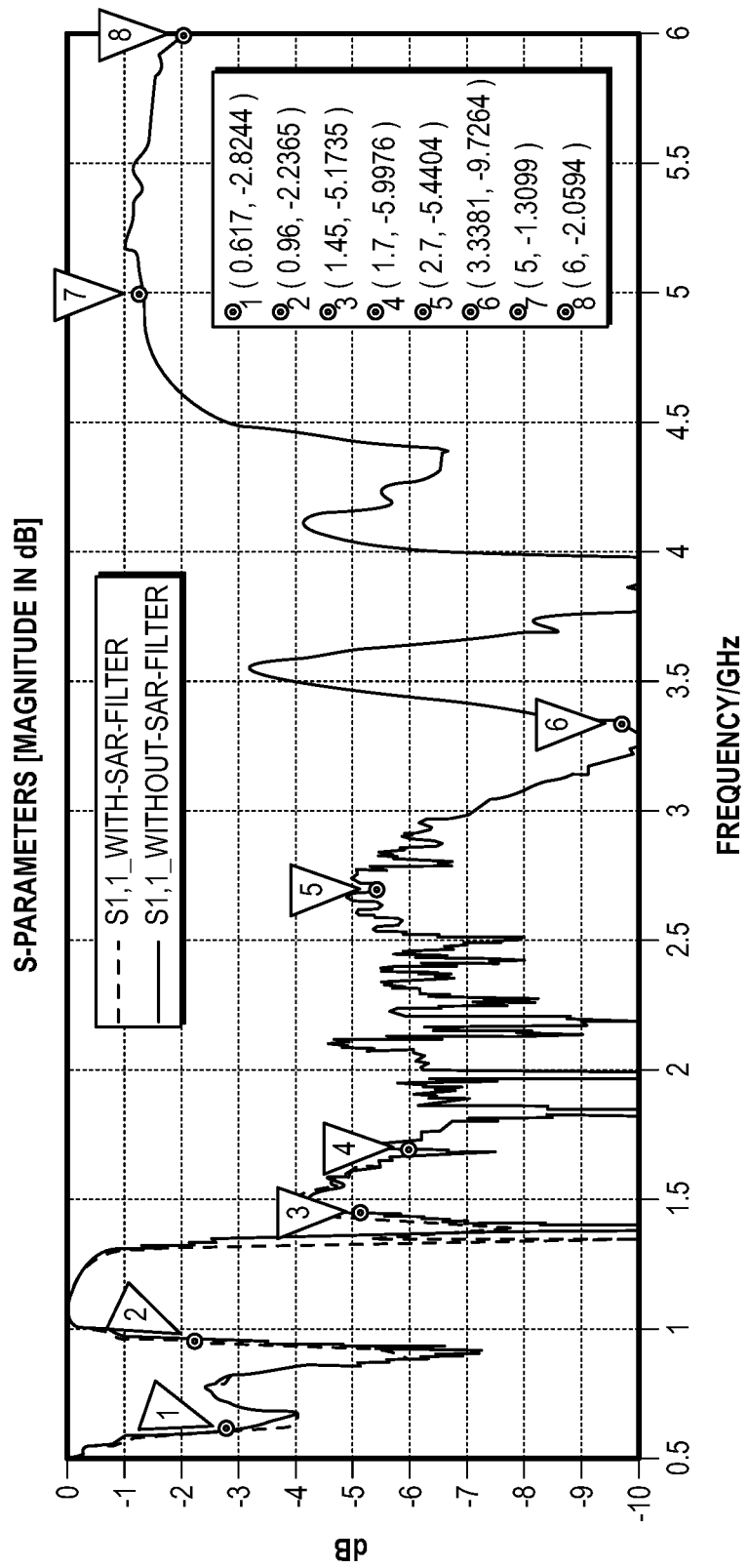
FIGS. 3F and 3G illustrate graphs showing examples of antenna return loss and efficiency in accordance with various embodiments.
Figure 3G:
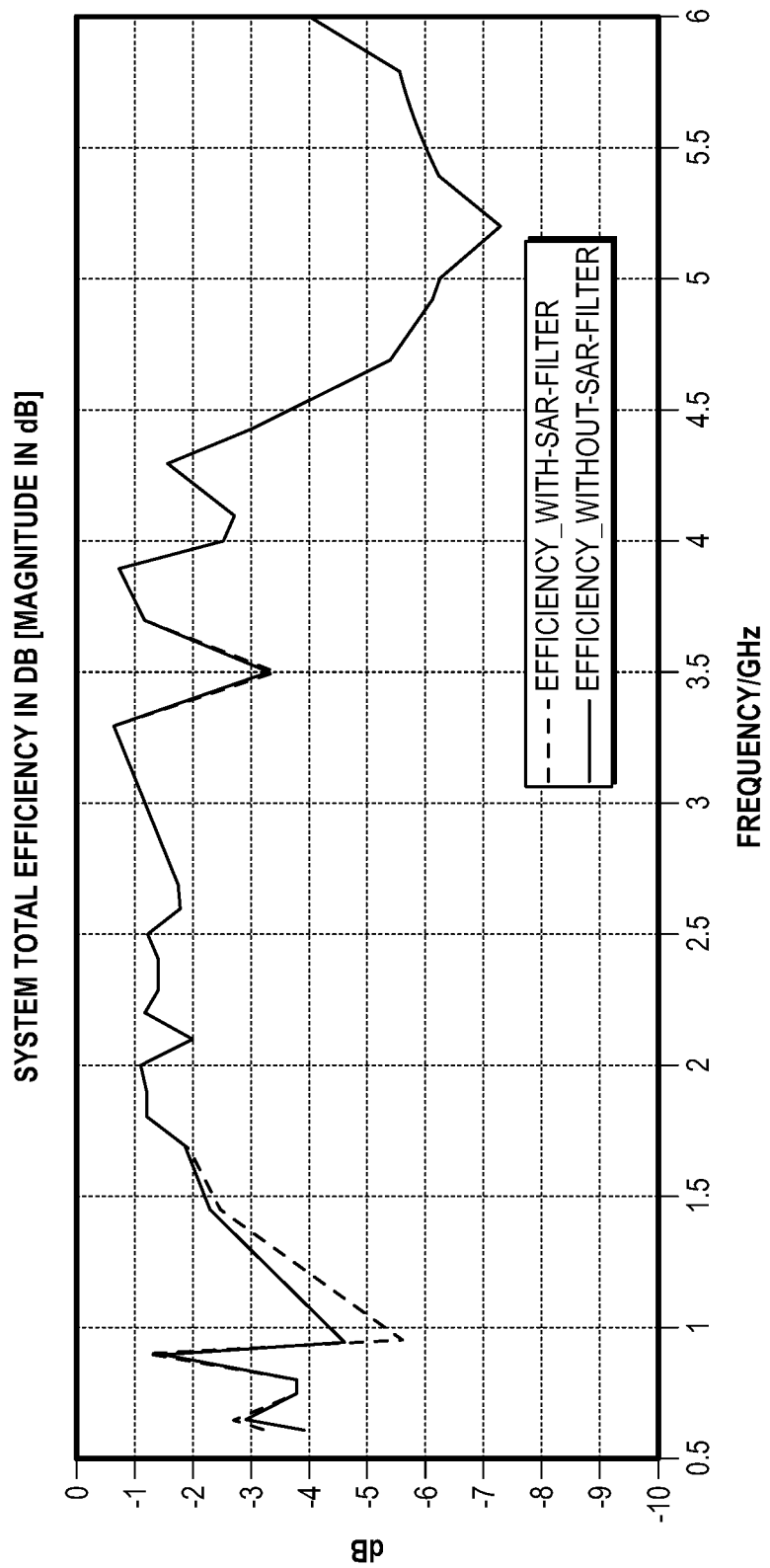

FIG. 3F is a graph showing antenna return loss with and without the SAR filter shown in FIGS. 3A-3E. FIG. 3G is a graph showing antenna efficiency with and without the SAR filter shown in FIGS. 3A-3E. As can be seen from these graphs, the SAR filter in this embodiment does not substantially degrade the antenna's performance, yet implements the SAR sensor element without the additional space and complexity required in conventional systems.

SAR Sensing Element Implementation for an Aperture (Metal-Ring) Antenna

Figure 4A:
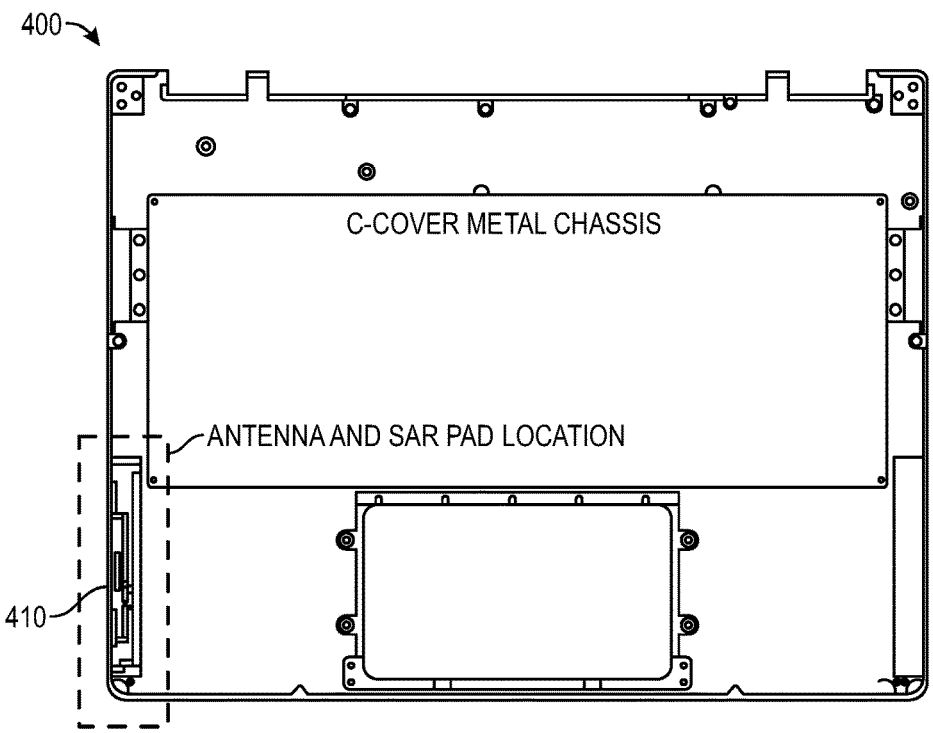
FIGS. 4A-4B illustrate examples of SAR sensing element implementations for an aperture antenna in accordance with various embodiments.
Figure 4B:
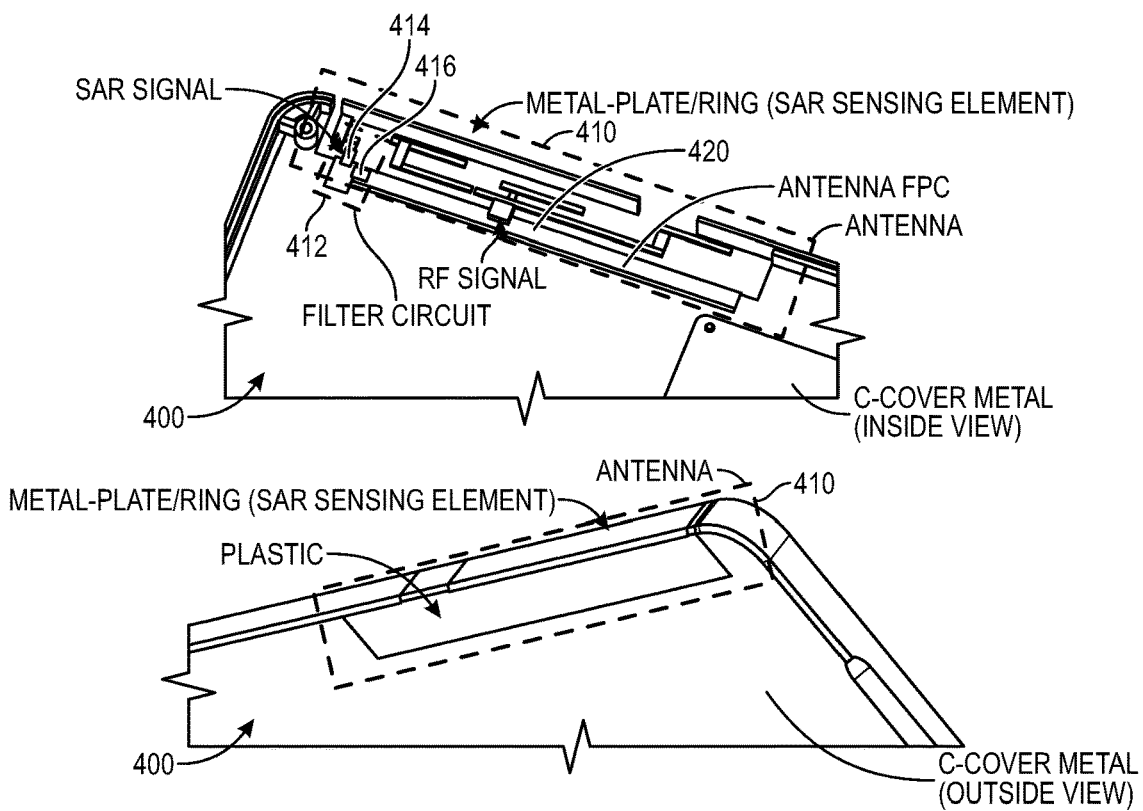

Examples of an SAR sensing element implementation for an aperture (also known as a "metal ring") antenna is illustrated in FIGS. 4A and 4B. FIG. 4A shows the location of an aperture antenna sensing element 410 in a laptop 400. As shown in FIG. 4B, the aperture antenna has two parts, a portion (edge) of the metal chassis of the laptop (C-Cover Metal Chassis) and an antenna FPC pattern 420. In this example, the edge of the chassis is used as the SAR sensing Pad. FIG. 4B illustrates the implementation of SAR pad using part of the antenna 420 and edge of chassis coupled to a filter circuit 412. The edge of the chassis acts as an SAR sensing element (pad), and the filter circuit 412 includes a low-pass filter 414 and high-pass filter 416 to split the SAR signal and RF signal from the edge of the chassis without affecting antenna performance.

SAR Sensing Element Implementation for a Slot Antenna

Figure 5A:
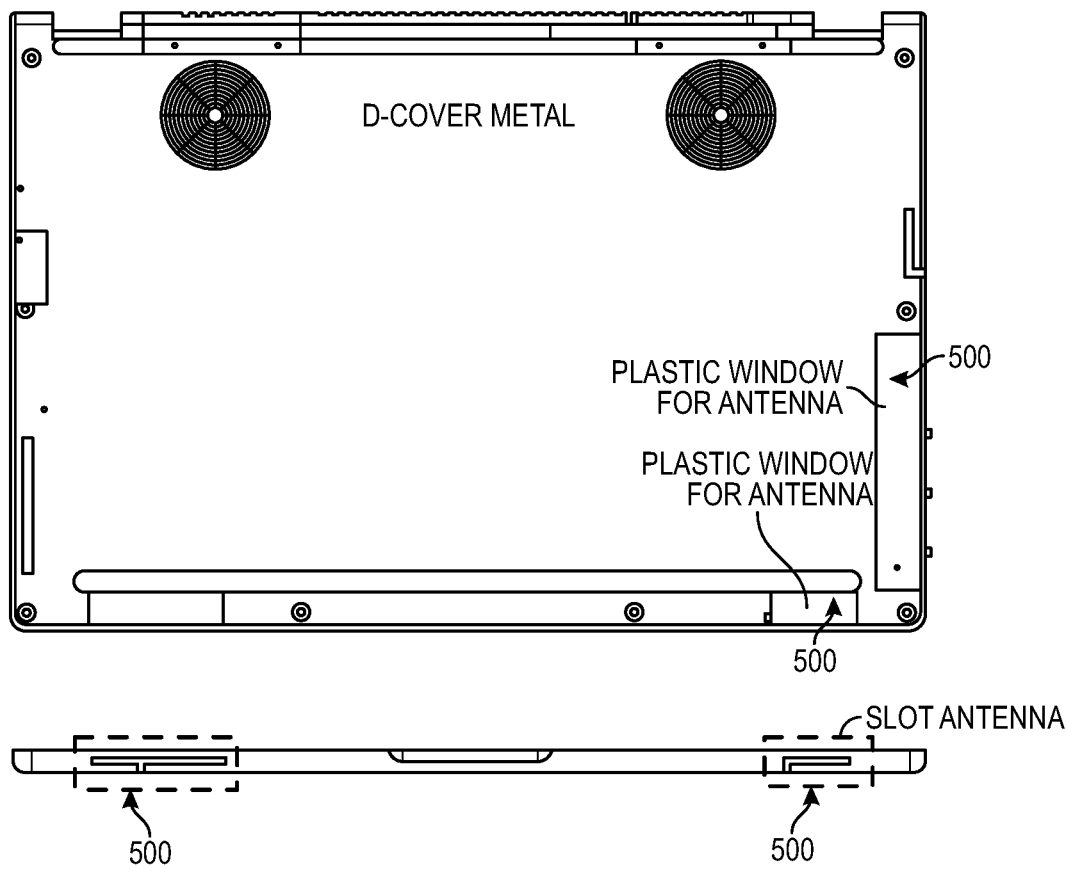
FIGS. 5A-5D illustrate examples of SAR sensing element implementations for a slot antenna in accordance with various embodiments.
Figure 5B:
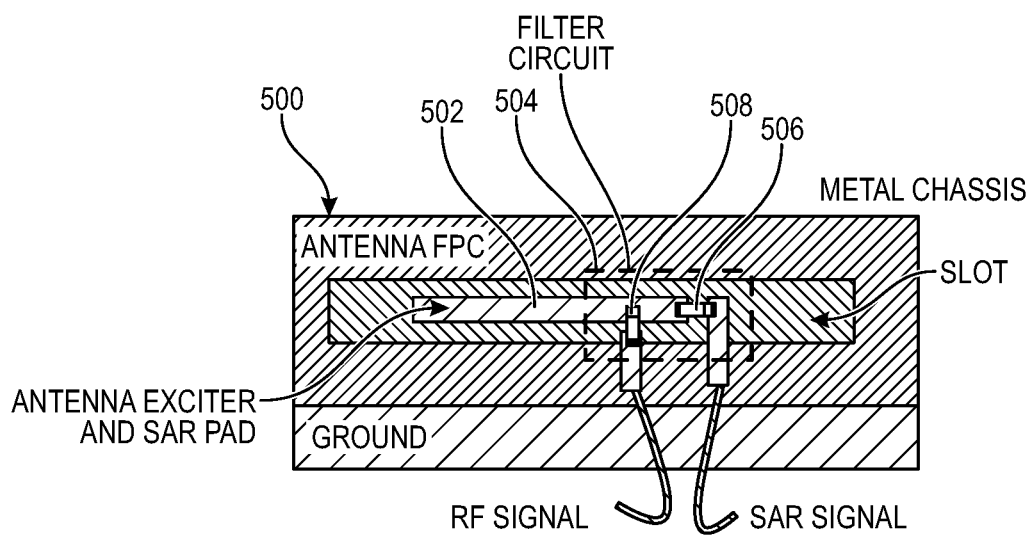
Figure 5C:
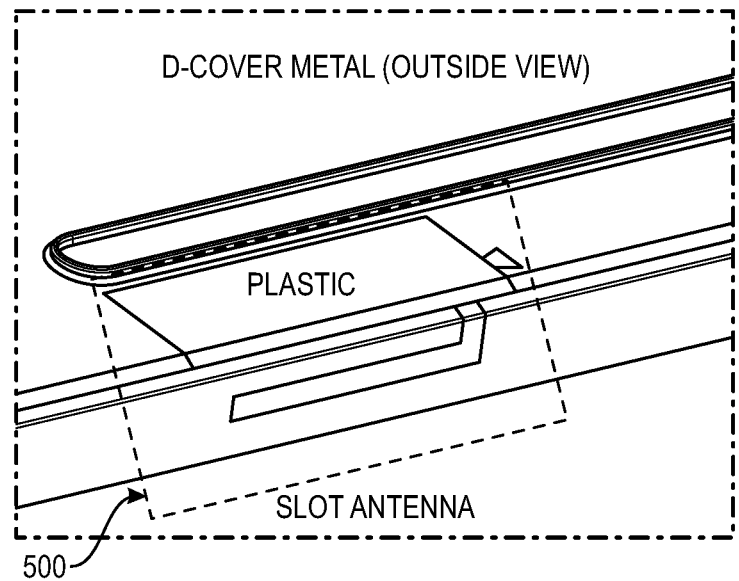
Figure 5C:
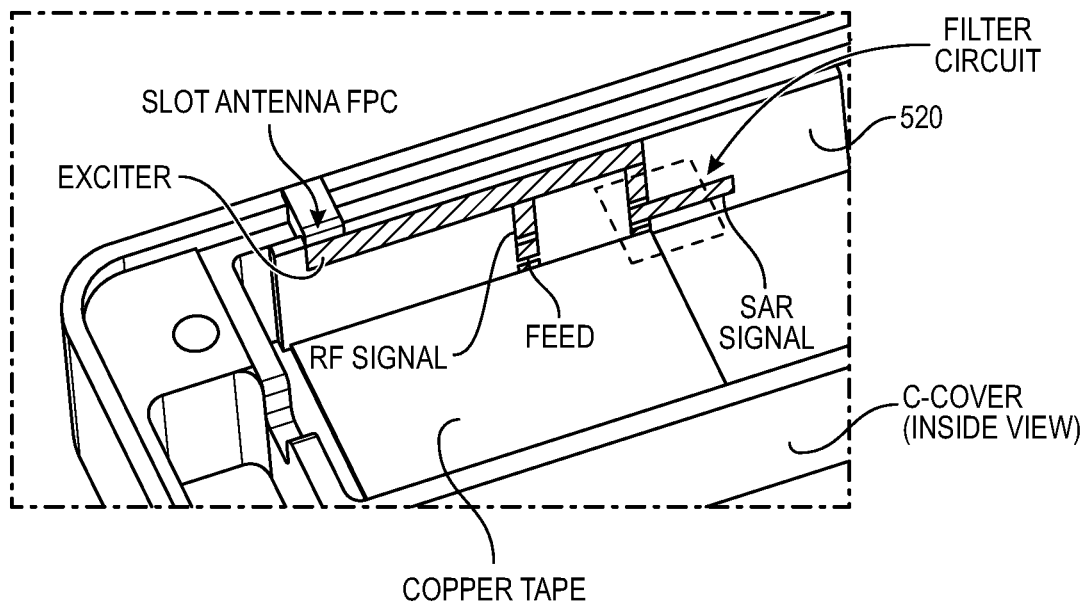
Figure 5D:
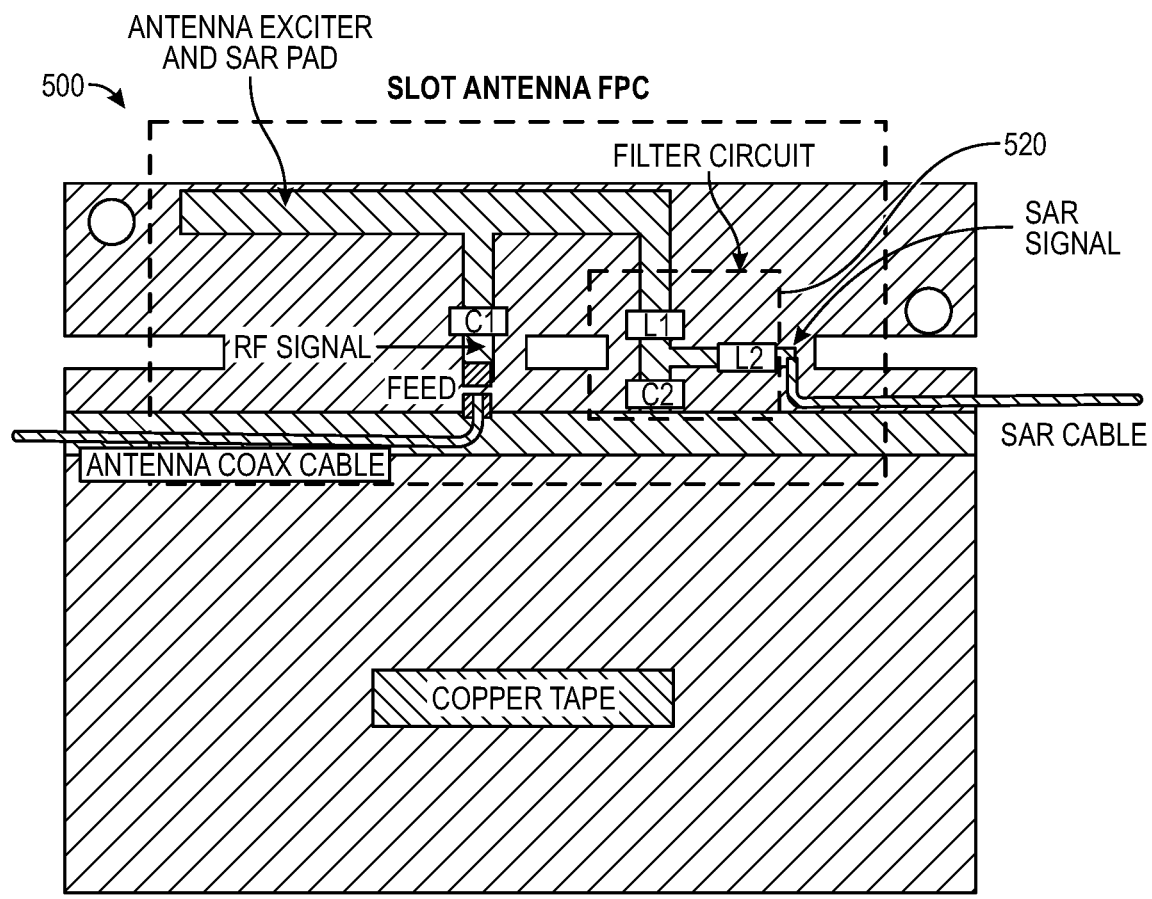

FIGS. 5A-5D illustrate examples of an SAR sensing element implementation for a slot antenna. FIG. 5A illustrates an example of the placement of slot antennas and corresponding plastic windows 500 used in a laptop system. As shown in FIG. 5B, the slot is excited using metal strip 502, which is coupled to filter circuit 504 to split the RF and SAR signal from the antenna exciter 502 (feed). High-pass filter 508 passes the RF signal from the strip 502 to the "RF Signal" line, while blocking the SAR signal. Low-pass filter 506 passes the SAR signal to the "SAR Signal" line while blocking the RF signal. FIG. 5C illustrates the implementation of an L-shaped slot antenna and antenna exciter with filter circuit. FIG. 5D shows an example of the Antenna FPC (Exciter) 500 and Filter 520 Implementation.

Using a Conductive Fastener (e.g., Metal Screw Boss) as a SAR Sensing Element

FIG. 6A-6F illustrate the implementation of a SAR sensing pad by utilizing components of a computing device, namely by using a conductive fastener, such as a metal boss screw, as a SAR sensing element. In this example (as well as for many computing devices) metal boss screws are required for fixing the speaker box, antenna PCB, antenna plastic carrier and connecting C-cover and D-cover. Some of these conductive fasteners (e.g., metal screws), which are close to the transmit antennas, can be used as SAR sensing element using following approach. In alternate embodiments, other conductive fasteners such as bolts, springs, pins, etc., may likewise be used as SAR sensing elements.

Figure 6A:
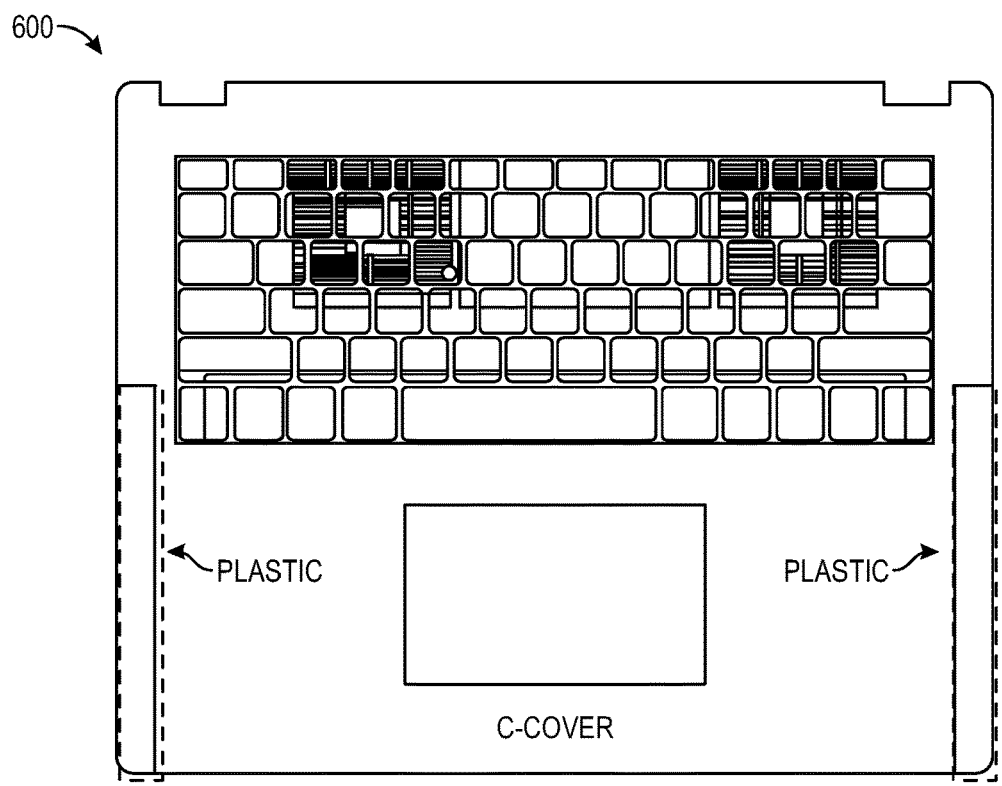
Figure 6B:
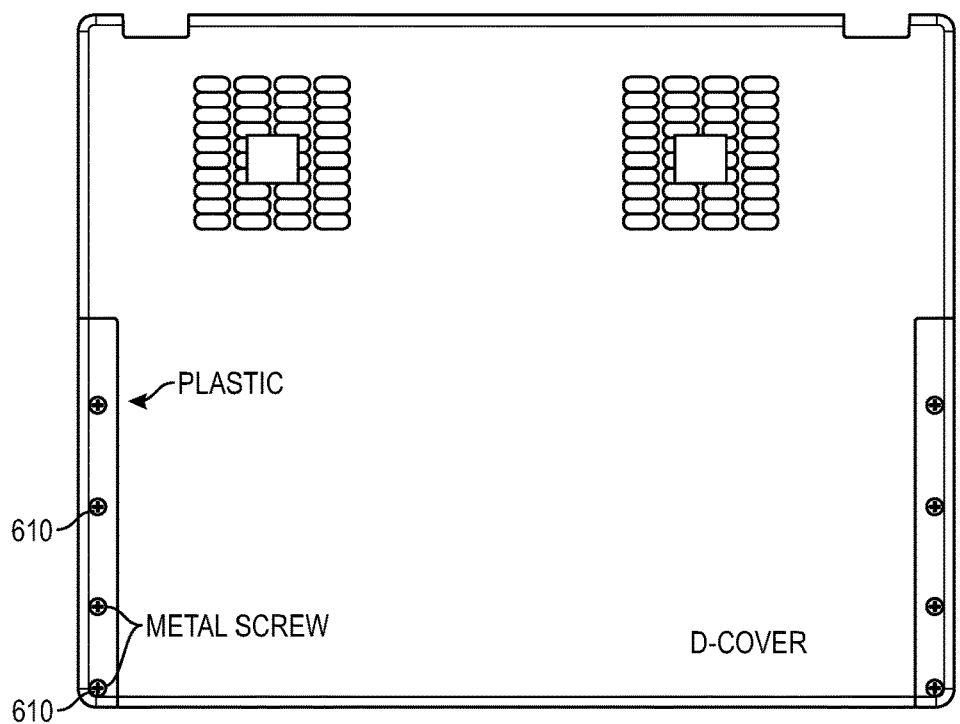

In the example depicted in FIGS. 6A-6F, laptop 600 includes a number of metal boss screws 610 that are used to assemble the C-cover and D-cover as shown in FIGS. 6A and 6B. As shown in FIGS. 6C1 and 6C2, these same metal screws 610 can be used as an SAR sensing element (proximity sensor). In some embodiments, the diameter of the head of the metal screw is a minimum of 5 mm. The metal screw 610 is connected to the terminal end 614a of SAR cable 612a (FIG. 6C1), or to a conductive surface 614b (e.g., a gold pad) of SAR FPC 612b (FIG. 6C2) for providing the SAR signal to an SAR sensor IC. The metal boss screw 610 detects the changes in the E-field and/or capacitance. The E-field changes in the presence of a human body/hand/finger. The capacitance difference provides an interrupt signal to SAR sensor IC. In some embodiments, rubber caps can be used to hide screws or avoid direct contact or ESD problems.

FIGS. 6C1, 6C2, and 6D illustrate the arrangement of the metal boss screw 610, C & D-cover, and SAR cable 612a/FPC 612b. In particular, FIG. 6C1 illustrates an example (top view in the top image, side view in the bottom image) where the metal boss screw 610 is coupled to an SAR cable 612a. FIG. 6C2 illustrates an example (top view in the top image, side view in the bottom image) where the metal boss screw is coupled to an SAR FPC 612b. In some embodiments, the screw 610 may be separated from the metal chassis or mounted on a plastic chassis. In some embodiments, the screws 610 or part of the cable terminal end 614a are projected away from the metal body and are not grounded. In some embodiments, the size of the cable terminal end can be configured (e.g., increased in size from a typical cable) to behave as SAR sensing element (pad). In other words, the conductive surface of the SAR conductor (614a or 614b) may be appropriately sized to generate the SAR signal in conjunction with the conductive fastener (e.g., screw 610).

For example, in some embodiments, the cable terminal end may be wider than a diameter of the main body of the SAR cable 612a. In one implementation, as shown in FIG. 6C, the cable terminal end 614a may include a ring 615a through which the screw 610 is disposed, and conductive projection 617 that extends from the ring 615 and couples to the main body of the SAR cable 612a. The projection 617 may be wider than the main body of the SAR cable 612a. In the FPC embodiment, the terminal end portion 614b and/or FPC 612b may be significantly wider than the ring 615b and/or screw 610. For example, for a screw 610 with a head diameter of 5 mm, the width of the terminal end portion 614b and/or FPC 612b may be between about 2.5 mm and 20 mm. In some embodiments, the diameter of the head of the screw 610 may range between 1.5 mm and 5 mm, while the diameter of the shaft of the screw 610 may range between 1 mm and 3 mm.

In some embodiments, the system may include a conductive insert adapted to receive the conductive fastener. For example, in FIGS. 6C and 6D screw 610 engages with metal nut insert 616. As with the fastener 610 and the SAR conductor (e.g., 614a/614b), the dimensions of the conductive insert 616 may be configured such that the combination of the fastener 610, SAR conductor 614a/614b, and insert 616 generate an appropriate SAR signal for the SAR sensor IC to determine the proximity of a human to the computing device.

Figure 6D:
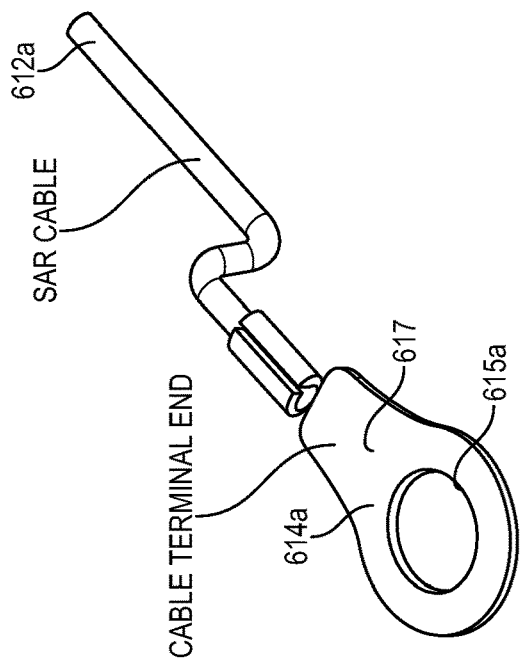
Figure 6D:
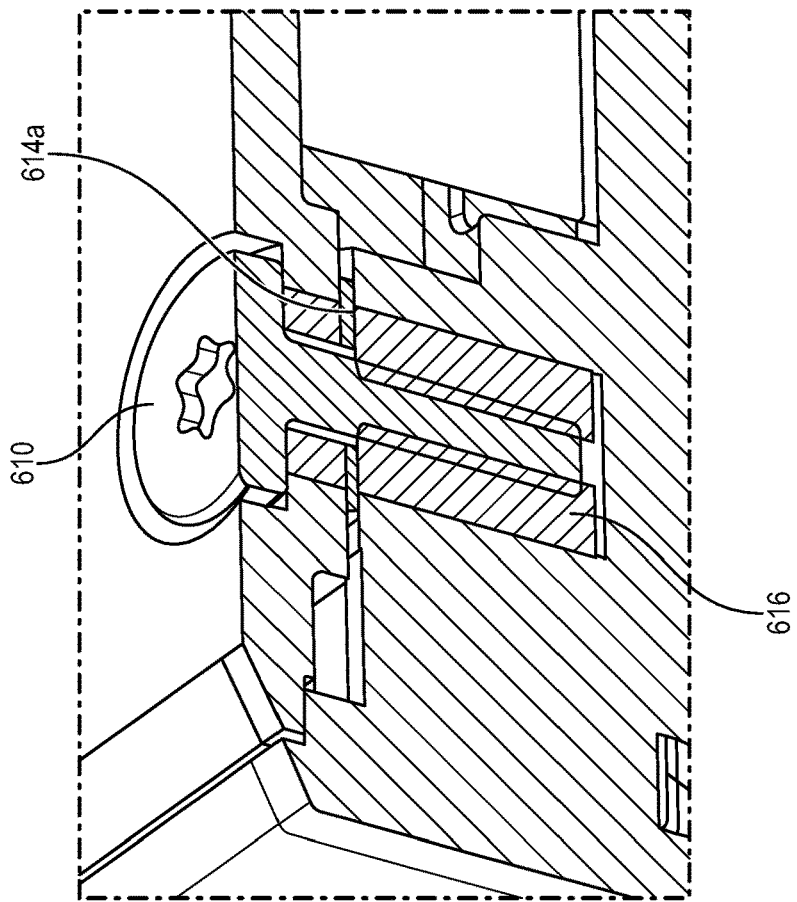
Figure 6E:
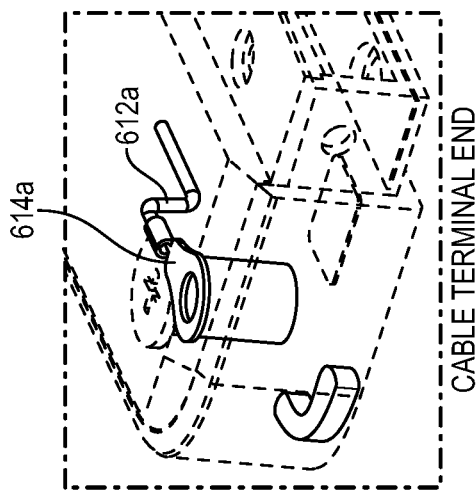
Figure 6E:
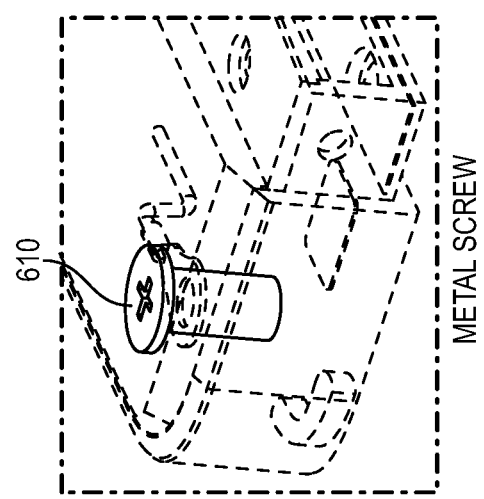
Figure 6E:
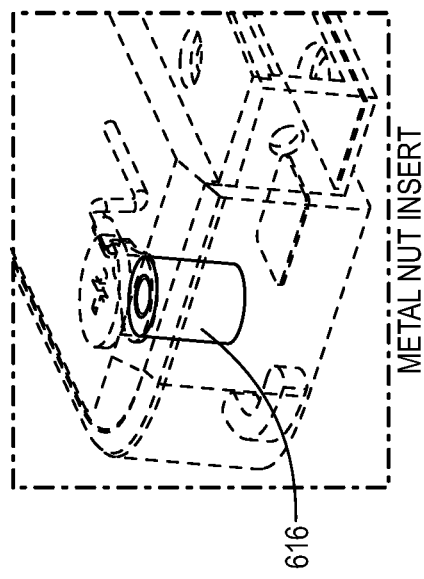
Figure 6E:
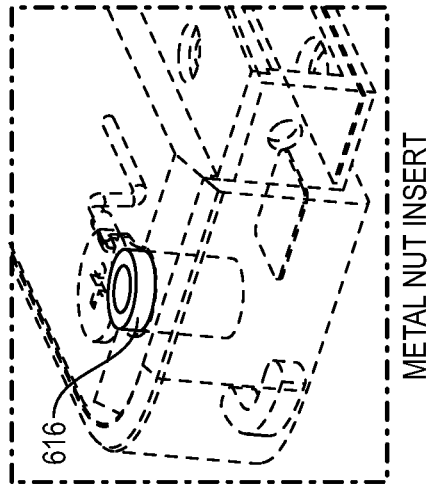
Figure 6E:
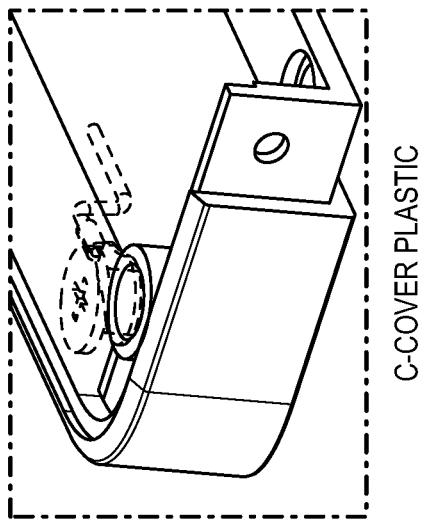
Figure 6E:
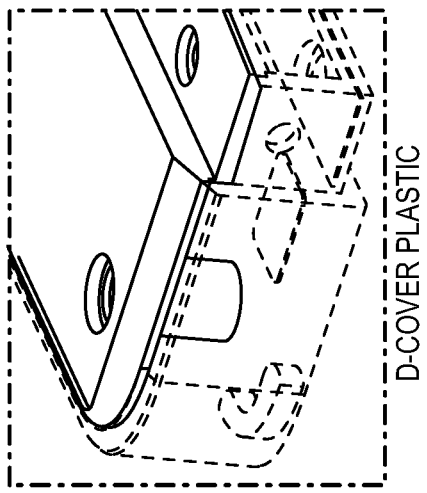

FIGS. 6D and 6E show various views of the screw 610 engaged with SAR cable 612a, as well as the position and orientation of SAR cable 612a, conductive surface 614a (the cable terminal end in this example), and the conductive (metal nut) insert 616 with respect to each other and the C-Cover and D-Cover plastic of the laptop casing.

Figure 6F:
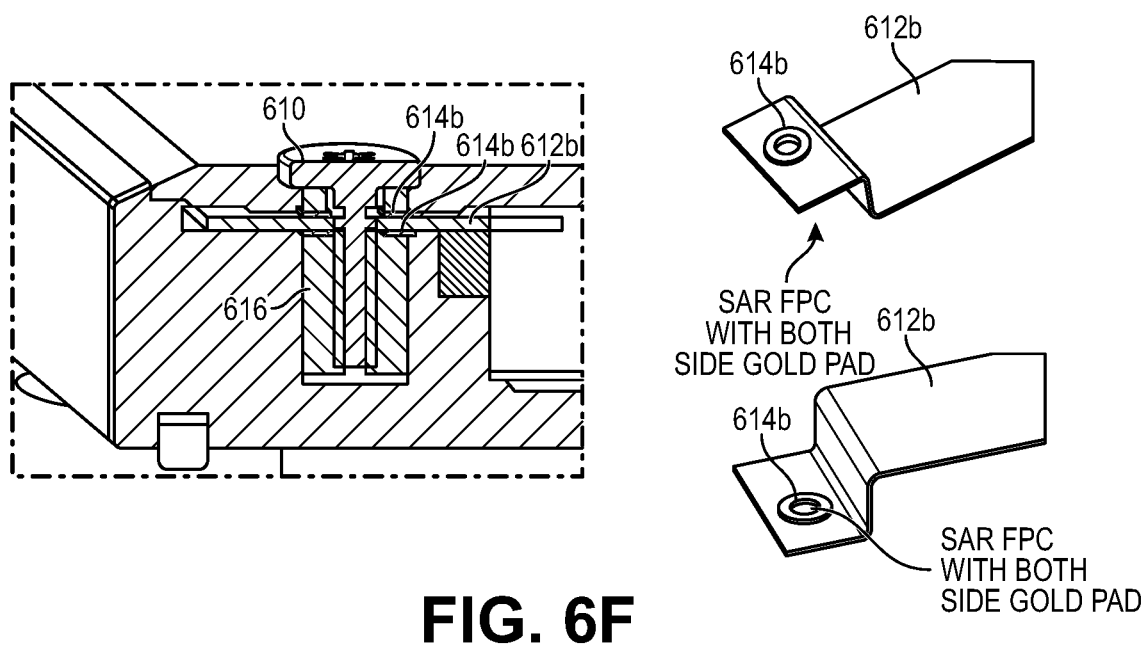

FIGS. 6F and 6G show various views of the screw 610 engaged with SAR FPC 612b, as well as the position and orientation of SAR FPC 612b, conductive surface 614b (the gold pad on both sides of the SAR FPC 612b in this example), and the conductive (metal nut) insert 616 with respect to each other and the C-Cover and D-Cover plastic of the laptop casing.

Figure 7:
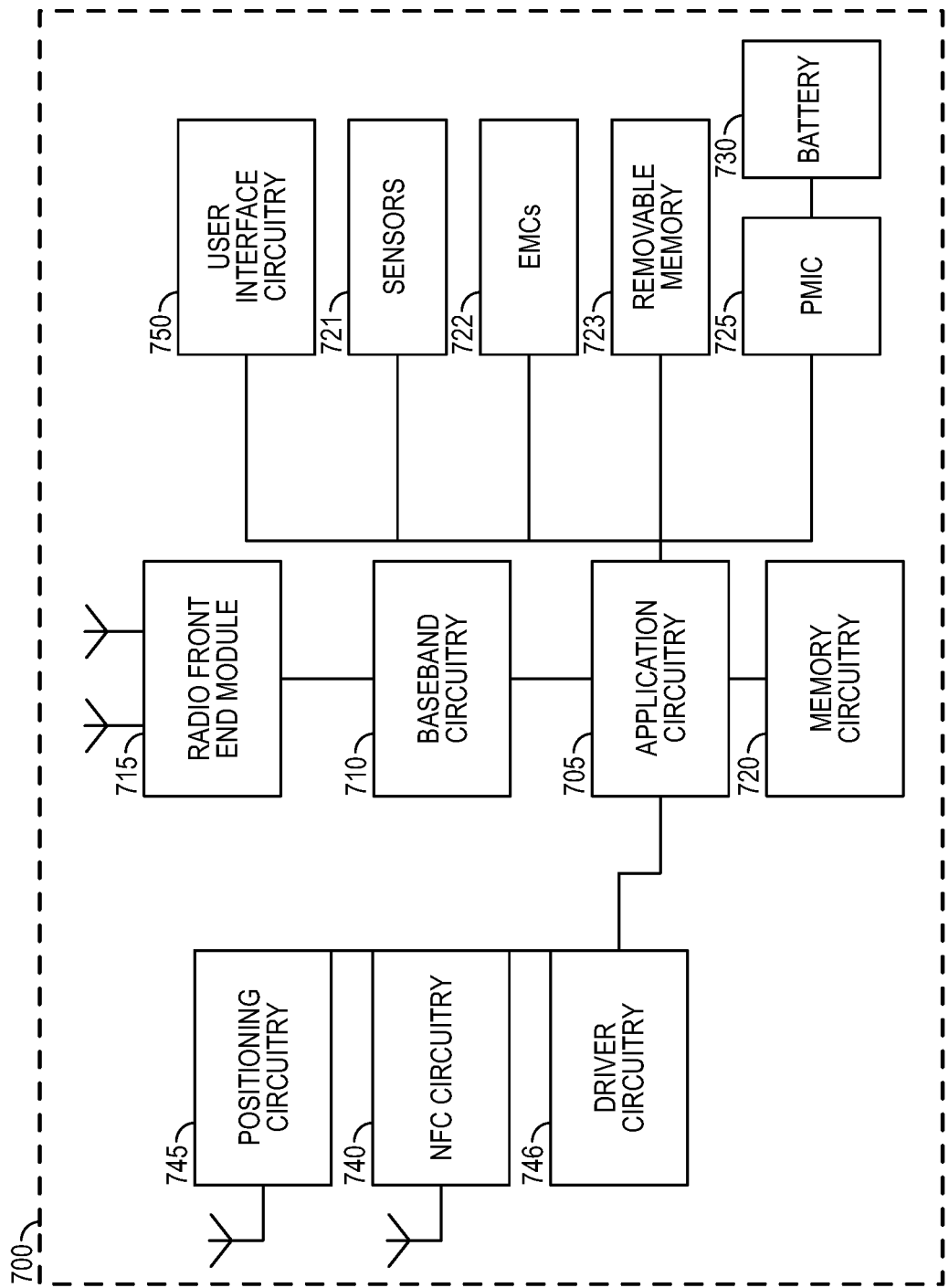
FIG. 7 illustrates an example of a computer platform in accordance with various embodiments.

FIG. 7 illustrates an example of a platform 700 (or "device 700") in accordance with various embodiments. The platform 700 may include one or more antenna assemblies as discussed herein. For example, the platform 700 may correspond to the laptop computer described in conjunction with SAR sensing element implementations of FIGS. 3A-3E, 4A-4B, 5A-5D, and 6A-6F, and/or another suitable computing device capable of communicating over one or more wireless communication protocols.

The platform 700 may include any combinations of the components shown in the example. The components of platform 700 may be implemented as integrated circuits (ICs), portions thereof, discrete electronic devices, or other modules, logic, hardware, software, firmware, or a combination thereof adapted in the computer platform 700, or as components otherwise incorporated within a chassis of a larger system. The block diagram of FIG. 7 is intended to show a high level view of components of the computer platform 700. However, some of the components shown may be omitted, additional components may be present, and different arrangement of the components shown may occur in other implementations.

Application circuitry 705 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 705 may be coupled with or may include memory/storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 705 may comprise, or may be, a special-purpose processor/controller to operate according to the various embodiments herein.

As examples, the processor(s) of application circuitry 705 may include an Intel® Architecture Core™ based processor, such as a Quark™, an Atom™, an i3, an i5, an i7, or an MCU-class processor, or another such processor available from Intel® Corporation, Santa Clara, CA The processors of the application circuitry 705 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 705 may be a part of a system on a chip (SoC) in which the application circuitry 705 and other components are formed into a single integrated circuit, or a single package, such as the Edison™ or Galileo™ SoC boards from Intel® Corporation.

Additionally or alternatively, application circuitry 705 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1010 are discussed infra with regard to FIG. 8.

The RFEMs 715 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 811 of FIG. 8 infra), and the RFEM may be connected to multiple antennas. In alternative implementations, both mmWave and sub-mmWave radio functions may be implemented in the same physical RFEM 715, which incorporates both mmWave antennas and sub-mmWave.

The memory circuitry 720 may include any number and type of memory devices used to provide for a given amount of system memory. As examples, the memory circuitry 720 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 720 may be developed in accordance with a Joint Electron Devices Engineering Council (JEDEC) low power double data rate (LPDDR)-based design, such as LPDDR2, LPDDR3, LPDDR4, or the like. Memory circuitry 720 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 720 may be on-die memory or registers associated with the application circuitry 705. To provide for persistent storage of information such as data, applications, operating systems and so forth, memory circuitry 720 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 700 may incorporate the three-dimensional (3D) cross-point (XPOINT) memories from Intel® and Micron®.

Removable memory circuitry 723 may include devices, circuitry, enclosures/housings, ports or receptacles, etc. used to couple portable data storage devices with the platform 700. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 700 may also include interface circuitry (not shown) that is used to connect external devices with the platform 700. The external devices connected to the platform 700 via the interface circuitry include sensor circuitry 721 and electro-mechanical components (EMCs) 722, as well as removable memory devices coupled to removable memory circuitry 723.

The sensor circuitry 721 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 722 include devices, modules, or subsystems whose purpose is to enable platform 700 to change its state, position, and/or orientation, or move or control a mechanism or (sub)system. Additionally, EMCs 722 may be configured to generate and send messages/signalling to other components of the platform 700 to indicate a current state of the EMCs 722. Examples of the EMCs 722 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 700 is configured to operate one or more EMCs 722 based on one or more captured events and/or instructions or control signals received from a service provider and/or various clients.

In some implementations, the interface circuitry may connect the platform 700 with positioning circuitry 745. The positioning circuitry 745 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-PNT IC that uses a master timing clock to perform position tracking/estimation without GNSS assistance. The positioning circuitry 745 may also be part of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various infrastructure (e.g., radio base stations), for turn-by-turn navigation applications, or the like In some implementations, the interface circuitry may connect the platform 700 with Near-Field Communication (NFC) circuitry 740. NFC circuitry 740 is configured to provide contactless, short-range communications based on radio frequency identification (RFID) standards, wherein magnetic field induction is used to enable communication between NFC circuitry 740 and NFC-enabled devices external to the platform 700 (e.g., an "NFC touchpoint"). NFC circuitry 740 comprises an NFC controller coupled with an antenna element and a processor coupled with the NFC controller. The NFC controller may be a chip/IC providing NFC functionalities to the NFC circuitry 740 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 740, or initiate data transfer between the NFC circuitry 740 and another active NFC device (e.g., a smartphone or an NFC-enabled POS terminal) that is proximate to the platform 700.

The driver circuitry 746 may include software and hardware elements that operate to control particular devices that are embedded in the platform 700, attached to the platform 700, or otherwise communicatively coupled with the platform 700. The driver circuitry 746 may include individual drivers allowing other components of the platform 700 to interact with or control various input/output (I/O) devices that may be present within, or connected to, the platform 700. For example, driver circuitry 746 may include a display driver to control and allow access to a display device, a touchscreen driver to control and allow access to a touchscreen interface of the platform 700, sensor drivers to obtain sensor readings of sensor circuitry 721 and control and allow access to sensor circuitry 721, EMC drivers to obtain actuator positions of the EMCs 722 and/or control and allow access to the EMCs 722, a camera driver to control and allow access to an embedded image capture device, audio drivers to control and allow access to one or more audio devices.

The power management integrated circuitry (PMIC) 725 (also referred to as "power management circuitry 725") may manage power provided to various components of the platform 700. In particular, with respect to the baseband circuitry 710, the PMIC 725 may control power-source selection, voltage scaling, battery charging, or DC-to-DC conversion. The PMIC 725 may often be included when the platform 700 is capable of being powered by a battery 730.

In some embodiments, the PMIC 725 may control, or otherwise be part of, various power saving mechanisms of the platform 700. For example, if the platform 700 is in an RRC Connected state, where it is still connected to the RAN node as it expects to receive traffic shortly, then it may enter a state known as Discontinuous Reception Mode (DRX) after a period of inactivity. During this state, the platform 700 may power down for brief intervals of time and thus save power. If there is no data traffic activity for an extended period of time, then the platform 700 may transition off to an RRC Idle state, where it disconnects from the network and does not perform operations such as channel quality feedback, handover, etc. The platform 700 goes into a very low power state and it performs paging where again it periodically wakes up to listen to the network and then powers down again. The platform 700 may not receive data in this state; in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 730 may power the platform 700, although in some examples the platform 700 may be mounted deployed in a fixed location, and may have a power supply coupled to an electrical grid. The battery 730 may be a lithium ion battery, a metal-air battery, such as a zinc-air battery, an aluminum-air battery, a lithium-air battery, and the like. In some implementations, such as in V2X applications, the battery 730 may be a typical lead-acid automotive battery.

In some implementations, the battery 730 may be a "smart battery," which includes or is coupled with a Battery Management System (BMS) or battery monitoring integrated circuitry. The BMS may be included in the platform 700 to track the state of charge (SoCh) of the battery 730. The BMS may be used to monitor other parameters of the battery 730 to provide failure predictions, such as the state of health (SoH) and the state of function (SoF) of the battery 730. The BMS may communicate the information of the battery 730 to the application circuitry 705 or other components of the platform 700. The BMS may also include an analog-to-digital (ADC) convertor that allows the application circuitry 705 to directly monitor the voltage of the battery 730 or the current flow from the battery 730. The battery parameters may be used to determine actions that the platform 700 may perform, such as transmission frequency, network operation, sensing frequency, and the like.

A power block, or other power supply coupled to an electrical grid may be coupled with the BMS to charge the battery 730. In some examples, the power block 730 may be replaced with a wireless power receiver to obtain the power wirelessly, for example, through a loop antenna in the computer platform 700. In these examples, a wireless battery charging circuit may be included in the BMS. The specific charging circuits chosen may depend on the size of the battery 730, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 750 includes various input/output (I/O) devices present within, or connected to, the platform 700, and includes one or more user interfaces designed to enable user interaction with the platform 700 and/or peripheral component interfaces designed to enable peripheral component interaction with the platform 700. The user interface circuitry 750 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 700. The output device circuitry may also include speakers or other audio emitting devices, printer(s), and/or the like. In some embodiments, the sensor circuitry 721 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 700 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 8:
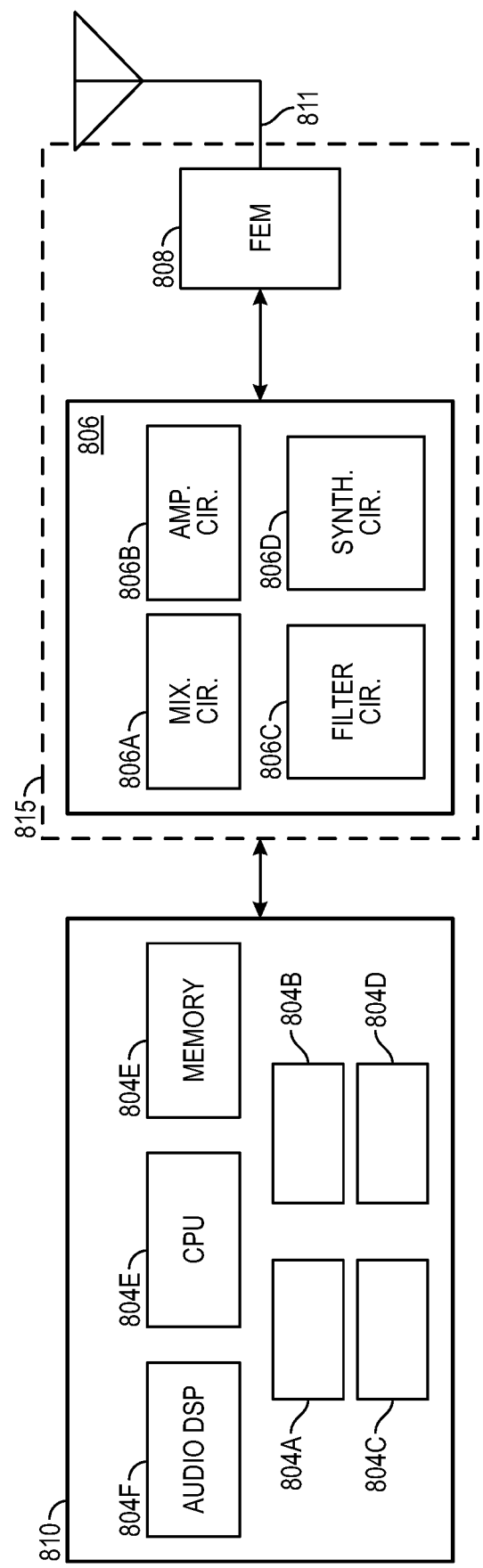
FIG. 8 illustrates example components of baseband circuitry and radio front end modules in accordance with various embodiments.

FIG. 8 illustrates example components of baseband circuitry 810 and radio front end modules (RFEM) 815 in accordance with various embodiments. The baseband circuitry 810 corresponds to the baseband circuitry 1010 of FIG. 7. The RFEM 815 corresponds to the RFEM 715 of FIG. 7. As shown, the RFEMs 815 may include Radio Frequency (RF) circuitry 806, front-end module (FEM) circuitry 808, antenna array 811 coupled together at least as shown.

The baseband circuitry 810 includes circuitry and/or control logic configured to carry out various radio/network protocol and radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 810 may include Fast-Fourier Transform (FFT), precoding, or constellation mapping/demapping functionality. In some embodiments, encoding/decoding circuitry of the baseband circuitry 810 may include convolution, tail-biting convolution, turbo, Viterbi, or Low Density Parity Check (LDPC)

encoder/decoder functionality. Embodiments of modulation/demodulation and encoder/decoder functionality are not limited to these examples and may include other suitable functionality in other embodiments. The baseband circuitry 810 is configured to process baseband signals received from a receive signal path of the RF circuitry 806 and to generate baseband signals for a transmit signal path of the RF circuitry 806. The baseband circuitry 810 is configured to interface with application circuitry 705 (see FIG. 7) for generation and processing of the baseband signals and for controlling operations of the RF circuitry 806. The baseband circuitry 810 may handle various radio control functions.

The aforementioned circuitry and/or control logic of the baseband circuitry 810 may include one or more single or multi-core processors. For example, the one or more processors may include a 3G baseband processor 804A, a 4G/LTE baseband processor 804B, a 5G/NR baseband processor 804C, or some other baseband processor(s) 804D for other existing generations, generations in development or to be developed in the future (e.g., sixth generation (6G), etc.). In other embodiments, some or all of the functionality of baseband processors 804A-D may be included in modules stored in the memory 804G and executed via a Central Processing Unit (CPU) 804E. In other embodiments, some or all of the functionality of baseband processors 804A-D may be provided as hardware accelerators (e.g., FPGAs, ASICs, etc.) loaded with the appropriate bit streams or logic blocks stored in respective memory cells. In various embodiments, the memory 804G may store program code of a real-time OS (RTOS), which when executed by the CPU 804E (or other baseband processor), is to cause the CPU 804E (or other baseband processor) to manage resources of the baseband circuitry 810, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 810 includes one or more audio digital signal processor(s) (DSP) 804F. The audio DSP(s) 804F include elements for compression/decompression and echo cancellation and may include other suitable processing elements in other embodiments.

In some embodiments, each of the processors 804A-804E include respective memory interfaces to send/receive data to/from the memory 804G. The baseband circuitry 810 may further include one or more interfaces to communicatively couple to other circuitries/devices, such as an interface to send/receive data to/from memory external to the baseband circuitry 810; an application circuitry interface to send/receive data to/from the application circuitry 705 of FIG. 7); an RF circuitry interface to send/receive data to/from RF circuitry 806 of FIG. 8; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1025.

In alternate embodiments (which may be combined with the above described embodiments), baseband circuitry 810 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 810 may include protocol processing circuitry with one or more instances of control circuitry (not shown) to provide control functions for the digital baseband circuitry and/or radio frequency circuitry (e.g., the radio front end modules 815).

Although not shown by FIG. 8, in some embodiments, the baseband circuitry 810 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 810 and/or RF circuitry 806 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 810 and/or RF circuitry 806 are part of a Wi-Fi communication system. In the second example, the protocol processing circuitry would operate Wi-Fi MAC and logical link control (LLC) functions. The protocol processing circuitry may include one or more memory structures (e.g., 804G) to store program code and data for operating the protocol functions, as well as one or more processing cores to execute the program code and perform various operations using the data. The baseband circuitry 810 may also support radio communications for more than one wireless protocol.

The various hardware elements of the baseband circuitry 810 discussed herein may be implemented, for example, as a solder-down substrate including one or more integrated circuits (ICs), a single packaged IC soldered to a main circuit board or a multi-chip module containing two or more ICs. In one example, the components of the baseband circuitry 810 may be suitably combined in a single chip or chipset, or disposed on a same circuit board. In another example, some or all of the constituent components of the baseband circuitry 810 and RF circuitry 806 may be implemented together such as, for example, a system on a chip (SoC) or System-in-Package (SiP). In another example, some or all of the constituent components of the baseband circuitry 810 may be implemented as a separate SoC that is communicatively coupled with and RF circuitry 806 (or multiple instances of RF circuitry 806). In yet another example, some or all of the constituent components of the baseband circuitry 810 and the application circuitry 1005 may be implemented together as individual SoCs mounted to a same circuit board (e.g., a "multi-chip package").

In some embodiments, the baseband circuitry 810 may provide for communication compatible with one or more radio technologies. For example, in some embodiments, the baseband circuitry 810 may support communication with an E-UTRAN or other WMAN, a WLAN, a WPAN. Embodiments in which the baseband circuitry 810 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path, which may include circuitry to down-convert RF signals received from the FEM circuitry 808 and provide baseband signals to the baseband circuitry 810. RF circuitry 806 may also include a transmit signal path, which may include circuitry to up-convert baseband signals provided by the baseband circuitry 810 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 810 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 810 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a of the transmit signal path may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 810 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 810 or the application circuitry 1005 depending on the desired output frequency. In some embodiments, a divider control input (e.g., N) may be determined from a look-up table based on a channel indicated by the application circuitry 1005.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path, which may include circuitry configured to operate on RF signals received from antenna array 88, amplify the received signals and provide the amplified versions of the received signals to the RF circuitry 806 for further processing. FEM circuitry 808 may also include a transmit signal path, which may include circuitry configured to amplify signals for transmission provided by the RF circuitry 806 for transmission by one or more of antenna elements of antenna array 88. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry 808 may include a receive signal path and a transmit signal path. The receive signal path of the FEM circuitry 808 may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission by one or more antenna elements of the antenna array 811.

The antenna array 811 comprises one or more antenna elements, each of which is configured convert electrical signals into radio waves to travel through the air and to convert received radio waves into electrical signals. For example, digital baseband signals provided by the baseband circuitry 810 is converted into analog RF signals (e.g., modulated waveform) that will be amplified and transmitted via the antenna elements of the antenna array 811 including one or more antenna elements (not shown). The antenna elements may be omnidirectional, direction, or a combination thereof. The antenna elements may be formed in a multitude of arranges as are known and/or discussed herein. For example, the antenna array 811 may include one or more of the antenna assemblies described herein. In some embodiments, the antenna array 811 may comprise metal strip (e.g., slot) antennas that are at least partially formed by a housing of the computing platform (e.g., platform 700). The antenna array 811 may comprise microstrip antennas or printed antennas that are fabricated on the surface of one or more printed circuit boards (e.g., rigid and/or flexible printed circuit boards). The antenna array 811 may be formed in as a patch of metal foil (e.g., a patch antenna) in a variety of shapes, and may be coupled with the RF circuitry 806 and/or FEM circuitry 808 using metal transmission lines or the like.

Processors of the application circuitry 705 and processors of the baseband circuitry 810 may be used to execute elements of one or more instances of a protocol stack. For example, processors of the baseband circuitry 810, alone or in combination, may be used execute Layer 3, Layer 2, or Layer 1 functionality, while processors of the application circuitry 1005 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node.

EXAMPLES

Example 1 includes an antenna assembly comprising: an antenna; and a filter circuit coupled to the antenna, wherein the filter circuit includes: a low pass filter coupled between the antenna and a specific absorption rate (SAR) controller, the low pass filter to filter out a radio frequency (RF) signal, and pass an SAR signal from the antenna to the SAR controller, wherein the RF signal has a higher frequency than the SAR signal; and a high pass filter coupled between the antenna an RF port, the high pass filter to pass the RF signal from the antenna to the RF port and to filter out the SAR signal.

Example 2 includes the antenna assembly of example 1 or some other example herein, wherein the low pass filter includes an inductor coupled between the antenna and the SAR controller, and the high pass filter includes a capacitor coupled between the antenna and the RF port.

Example 3 includes the antenna assembly of example 1 or some other example herein, wherein the antenna is a first conductive antenna portion, and the antenna assembly further includes a second conductive antenna portion coupled to the RF port.

Example 4 includes the antenna assembly of example 3 or some other example herein, wherein the high pass filter includes a capacitor, and wherein the first conductive antenna portion is coupled to a first lead of the capacitor and the second conductive antenna portion is coupled to a second lead of the capacitor.

Example 5 includes the antenna assembly of example 3 or some other example herein, wherein the antenna is an aperture antenna, wherein the first portion of the antenna includes an portion of a chassis, and wherein the second portion of the antenna includes a flexible printed circuit (FPC) antenna pattern.

Example 6 includes the antenna assembly of example 1 or some other example herein, wherein the antenna is a printed circuit board (PCB) antenna or a slot antenna.

Example 7 includes a device comprising: an antenna; an RF port adapted to receive a radio frequency (RF) signal from the antenna; an SAR controller adapted to receive a specific absorption rate (SAR) signal from the antenna; and a filter circuit coupled to the antenna, wherein the filter circuit includes: a low pass filter coupled between the antenna and the SAR controller, the low pass filter to filter out the RF signal, and pass the SAR signal from the antenna to the SAR controller, wherein the RF signal has a higher frequency than the SAR signal; and a high pass filter coupled between the antenna and the RF port, the high pass filter to pass the RF signal from the antenna to the RF port and to filter out the SAR signal.

Example 8 includes the device of example 7 or some other example herein, wherein the low pass filter includes an inductor coupled between the antenna and the SAR controller, and the high pass filter includes a capacitor coupled between the antenna and the RF port.

Example 9 includes the device of example 7 or some other example herein, wherein the antenna is a first conductive antenna portion, and the antenna assembly further includes a second conductive antenna portion coupled to the RF port.

Example 10 includes the device of example 9 or some other example herein, wherein the high pass filter includes a capacitor, and wherein the first conductive antenna portion is coupled to a first lead of the capacitor and the second conductive antenna portion is coupled to a second lead of the capacitor.

Example 11 includes the device of example 9 or some other example herein, wherein the antenna is an aperture antenna, wherein the first portion of the antenna includes an portion of a chassis, and wherein the second portion of the antenna includes a flexible printed circuit (FPC) antenna pattern.

Example 12 includes the device of example 7 or some other example herein, wherein the antenna is a printed circuit board (PCB) antenna or a slot antenna.

Example 13 includes a specific absorption rate (SAR) sensor comprising: a conductive fastener; an SAR conductor coupled to the conductive fastener; and an integrated circuit (IC) coupled to the SAR conductor to receive an SAR signal from the conductive fastener via the SAR conductor, and to sense a proximity of a human based on the SAR signal.

Example 14 includes the SAR sensor of example 13 or some other example herein, wherein the SAR signal indicates a change in an electric field or capacitance.

Example 15 includes the SAR sensor of example 13 or some other example herein, further comprising a non-conductive cap coupled to a portion of the conductive fastener.

Example 16 includes the SAR sensor of example 13 or some other example herein, wherein the conductive fastener is adapted for attaching two portions of a computing device.

Example 17 includes the SAR sensor of example 13 or some other example herein, wherein the conductive fastener includes a screw, bolt, spring, or pin.

Example 18 includes the SAR sensor of example 13 or some other example herein, wherein the SAR conductor includes a cable or a flexible printed circuit (FPC).

Example 19 includes the SAR sensor of example 18 or some other example herein, wherein the SAR conductor includes a conductive surface surrounding at least a portion of the conductive fastener and conductively coupled to the conductive fastener, wherein the conductive surface of the SAR conductor is sized to generate the SAR signal in conjunction with the conductive fastener.

Example 20 includes the SAR sensor of example 13 or some other example herein, further comprising a conductive insert adapted to receive the conductive fastener.

Example 21 includes the SAR sensor of example 13 or some other example herein, wherein the conductive fastener is not grounded.

Example 22 may include an apparatus comprising means to perform one or more elements of a method described in or related to any of examples 1-21, or any other method or process described herein.

Example 23 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 24 may include an apparatus comprising logic, modules, or circuitry to perform one or more elements of a method described in or related to any of examples 1-21, or any other method or process described herein.

Example 25 may include a method, technique, or process as described in or related to any of examples 1-21, or portions or parts thereof.

Example 26 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 27 may include a signal as described in or related to any of examples 1-21, or portions or parts thereof.

Example 28 may include a signal in a wireless network as shown and described herein.

Example 29 may include a method of communicating in a wireless network as shown and described herein.

Example 30 may include a system for providing wireless communication as shown and described herein.

Example 31 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. An antenna assembly comprising:
   an antenna that includes a first portion and a second portion, the second portion coupled to a radio frequency (RF) port; and
   a filter circuit coupled to the antenna, wherein the filter circuit includes:
   a low pass filter coupled between the first portion of the antenna and a specific absorption rate (SAR) controller, the low pass filter to filter out an RF signal, and pass an SAR signal from the first and second portions of the antenna to the SAR controller, wherein the RF signal has a higher frequency than the SAR signal; and
   a high pass filter coupled between the first portion of the antenna and the second portion of the antenna, the high pass filter to pass the RF signal from the first portion of the antenna to the RF port via the second portion of the antenna, and to filter out the SAR signal.

2. The antenna assembly of claim 1, wherein the low pass filter includes an inductor coupled between the second portion of the antenna and the SAR controller, and the high pass filter includes a capacitor coupled between the first portion of the antenna and the second portion of the antenna.

3. The antenna assembly of claim 1, wherein the high pass filter includes a capacitor, and wherein the first antenna portion is coupled to a first lead of the capacitor and the second antenna portion is coupled to a second lead of the capacitor.

4. The antenna assembly of claim 1, wherein the antenna is an aperture antenna, wherein the first portion of the antenna includes a portion of a chassis, and wherein the second portion of the antenna includes a flexible printed circuit (FPC) antenna pattern.

5. The antenna assembly of claim 1, wherein the antenna is a printed circuit board (PCB) antenna or a slot antenna.

6. A device comprising:
an antenna that includes a first portion and a second portion;
a radio frequency (RF) port adapted to receive an RF signal from the antenna, the RF port coupled to the second portion of the antenna;
an SAR controller adapted to receive a specific absorption rate (SAR) signal from the antenna; and
a filter circuit coupled to the antenna, wherein the filter circuit includes:
  a low pass filter coupled between the first portion of the antenna and the SAR controller, the low pass filter to filter out the RF signal, and pass the SAR signal from the first portion of the antenna to the SAR controller, wherein the RF signal has a higher frequency than the SAR signal; and
  a high pass filter coupled between the first portion of the antenna and the second portion of the antenna, the high pass filter to pass the RF signal from the first portion of the antenna to the RF port via the second portion of the antenna, and to filter out the SAR signal.

7. The device of claim 6, wherein the low pass filter includes an inductor coupled between the first portion of the antenna and the SAR controller, and the high pass filter includes a capacitor coupled between the first portion of the antenna and the second portion of the antenna.

8. The device of claim 6, wherein the high pass filter includes a capacitor, and wherein the first antenna portion is coupled to a first lead of the capacitor and the second antenna portion is coupled to a second lead of the capacitor.

9. The device of claim 6, wherein the antenna is an aperture antenna, wherein the first portion of the antenna includes a portion of a chassis, and wherein the second portion of the antenna includes a flexible printed circuit (FPC) antenna pattern.

10. The device of claim 6, wherein the antenna is a printed circuit board (PCB) antenna or a slot antenna.

\* \* \* \* \*